April 2, 1940.  P. B. DREISBAUGH  2,195,481
TRACTOR
Filed April 3, 1939  2 Sheets-Sheet 1

INVENTOR.
PERRY B. DREISBAUGH
BY
ATTORNEY.

April 2, 1940.                P. B. DREISBAUGH                2,195,481
                                   TRACTOR
                          Filed April 3, 1939        2 Sheets-Sheet 2

INVENTOR.
PERRY B. DREISBAUGH
BY
ATTORNEY.

UNITED STATES PATENT OFFICE 2,195,481

TRACTOR

Perry B. Dreisbaugh, Sheffield Lake, Ohio, assignor of one-half to Lloyd R. Waller, Avon Lake, Ohio Application April 3, 1939, Serial No. 265,733

6 Claims. (Cl. 97—48)

This invention relates to tractors of that type employed in the cultivation of soil and has for its object to provide a tractor of improved construction far superior in handling and efficiency to those at present available.

At the present time the large type of power driven tractor used on the farm is of course efficient for its intended purpose. While it covers a lot of ground it requires lots of space so that it may be turned around at the end of each run. Furthermore because of its great size it is expensive to purchase and thereby unavailable to many farmers. Additionally because of its size it is an impracticable implement for use in hothouses or on small truck farms.

For the latter there is available small hand pushed cultivators utilized because of their small size and convenience but these lack sufficient weight and the ability to produce a satisfactory job. Despite the lightness of these cultivators, it requires effort in pushing them thus resulting in fatigue to the operator.

One of the objects of the present invention is therefore to provide a small compact motor operated tractor particularly adapted for use in hothouse or on small truck farms.

Another object of the present invention is to provide a tractor capable of operation in opposite directions without the necessity for turning bodily at the end of the run thus providing a tractor particularly desirable for hothouse use.

Another object of the present invention is to provide the tractor with a guiding handle pivoted for movement to either end of the tractor depending upon the direction of travel.

Another object of the present invention is to utilize the pivotal movement of the handle for automatically reversing the power drive at the end of the run.

A still further object of the invention is to mount the cultivating steels or tools on the handle in such a manner that they will properly engage the ground for cultivation during movement of the tractor in either direction.

A still further object of the invention is to provide a tractor of the type referred to which is simple in construction, efficient in operation and relatively inexpensive to manufacture.

With the objects above indicated and other objects hereinafter explained in view, my invention consists in the construction and combination of elements hereinafter described and claimed.

Referring to the drawings.

Figure 1:
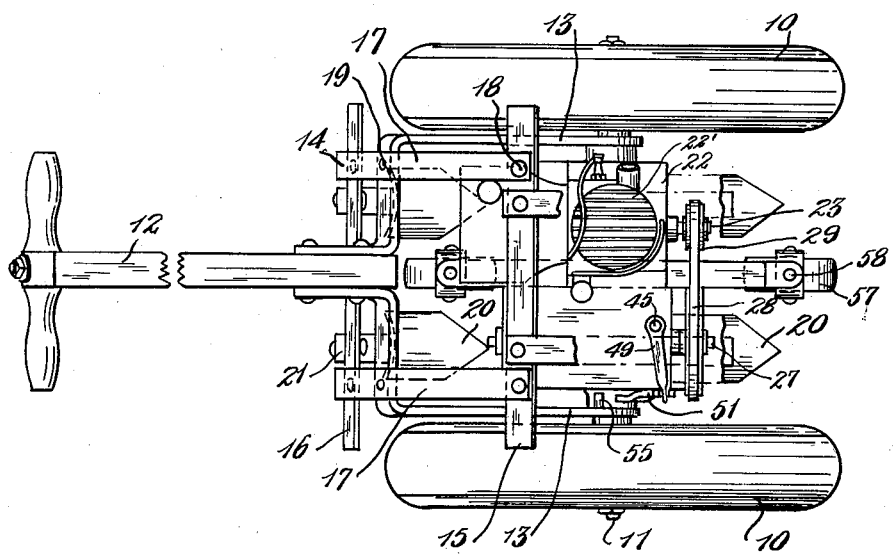
Figure 1 is a top plan view of a tractor embodying the present invention.

In the drawings I have illustrated a tractor embodying the present invention and, while the tractor is particularly adapted for use in hothouses or on small farms, the novel features may well be adapted for other embodiments as will be well recognized by those skilled in the art. The tractor comprises a pair of ground engaging wheels 10 suitably spaced apart and connected by a cross axle 11 in such a manner that the axle rotates with the wheels. The wheels 10 in the present instance are of the well known pneumatic tired type but they may of course be of other forms.

Figure 2:
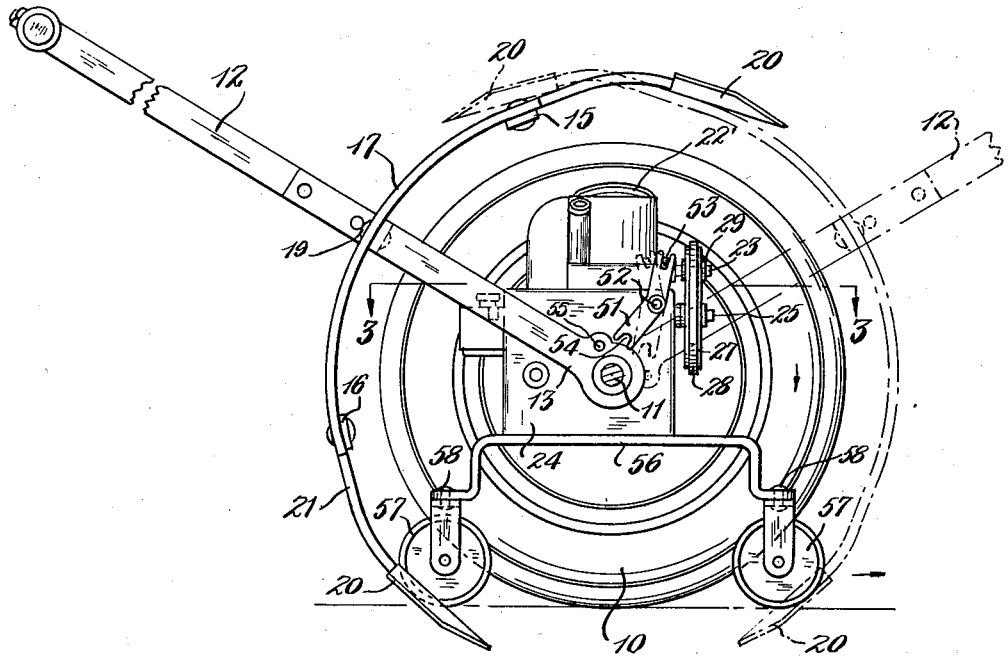
Figure 2 is a side elevational view of that shown in Figure 1.

The tractor has a steering handle 12, the inner end of which is provided with a pair of bifurcated arms 13 disposed in close spaced relation with respect to the adjacent tire, the inner ends of the arms having aligned openings for rotatably receiving the axle 11. By pivotally mounting the handle 12 upon the axle 11, it will be apparent that the tractor may be moved in one direction as shown in Figures 1 and 2 with the handle in its relative position or in an opposite direction, as indicated by the dotted lines of the handle in Figure 2, without the necessity of having turned the tractor around about a vertical axis. This feature embodies a decided advantage over the types of tractors available making it particularly useful in hothouses where space is at a premium.

Of course, the tractor should be provided with suitable cultivating tools and these may be mounted in any desirable manner but preferably by providing a tool frame 14. This frame consists of a pair of flat bars 15 and 16 disposed transversely outwardly from the tires and in spaced relation above and below the arms 13. These bars are connected together at their opposite ends by a pair of arcuate shaped strap members 17, the ends of which are riveted at 18 or otherwise secured to the adjacent bars 15 and 16, more clearly shown in Figure 1. To secure the frame to the handle 12, the strap members 17 are riveted at 19 or otherwise secured to the adjacent portions of the arms 13 to provide a rigid strong structure. The cultivating tools such as shown at 20 have extensions 21, the inner ends of which are bolted or otherwise secured to the adjacent bars 16 and 15. The tools 20 are so positioned with respect to the handle 12 that when the tractor is moved in the direction of the arrow, as indicated in Figure 2, the tools enter the ground and affect a suitable working of the soil depending, of course, upon the type of tool attached. These tools are also removable and interchangeable so that different tools may be used in subsequent operations as is required in the cultivation of soil. A duplicate set of tools is also mounted at the opposite end of the frame so that when the tractor is moved in a reversed direction to that shown in Figure 2 the tools will be available and in proper position for engagement with the soil.

So far no mention has been made of any means for driving the tractor and, while various means may be adopted, the use of a small fuel engine is particularly advantageous. The engine preferably is of a well known standard type ranging from ½ to 2 horse power predeterminately selected depending upon the work to be done. The engine indicated generally by the numeral 22' preferably has a throttle governor to maintain constant speed regardless of load and also includes a housing 22 enclosing the well known power driving mechanism for imparting rotation to a drive shaft 23 rotatably mounted in the housing. The housing 22 is disposed above the axle 11 but connected to the latter without interfering with its rotation in either direction.

Figure 4:
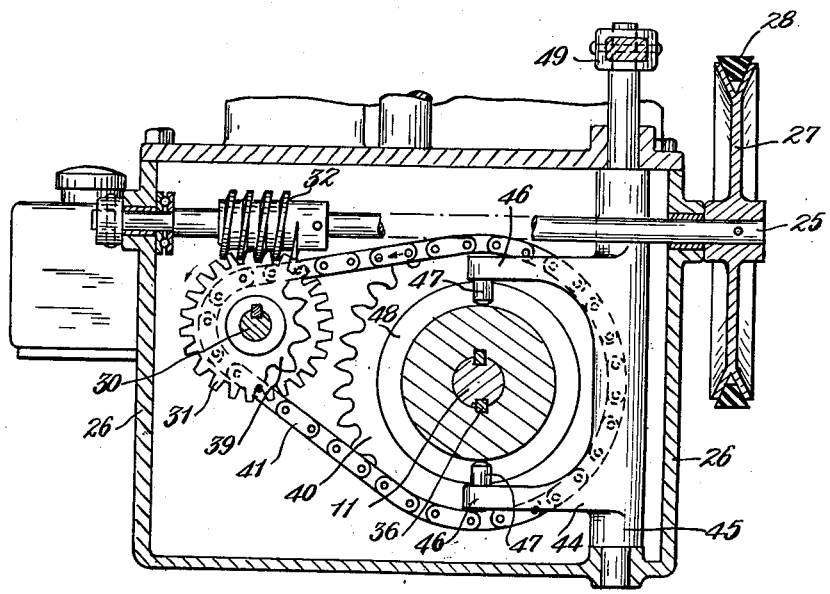
Figure 4 is a vertical sectional view taken on line 4—4 of Figure 3 and showing further details of the transmission.

A transmission housing 24 of box like shape is normally open at its upper end and disposed between the end of the engine housing 22 and the outer adjacent arm 13, the side walls of the housing 24 being provided with aligned openings through which the axle 11 extends and within which it is free to rotate in either direction. The adjacent walls of the housings 22 and 24 are preferably connected by means of welding but may be connected in any other desirable manner so as to affect a unitary structure. An input drive shaft 25 extends longitudinally of the housing 24 being disposed above the axle 11 and having its opposite ends rotatably mounted in the end walls 26 of the housing, as more clearly shown in Figure 4. The forward end of the shaft 25 projects outwardly beyond the housing and has a wheel 27 securely mounted thereon, the outer periphery of which is V-shaped to receive one portion of a V drive belt 28 which has its other portion disposed in a similar V-shaped groove in a drive wheel 29 secured upon the end of the engine drive shaft 23. In this manner, power is imparted from the engine drive shaft 23 to the input shaft of the transmission.

Figure 3:
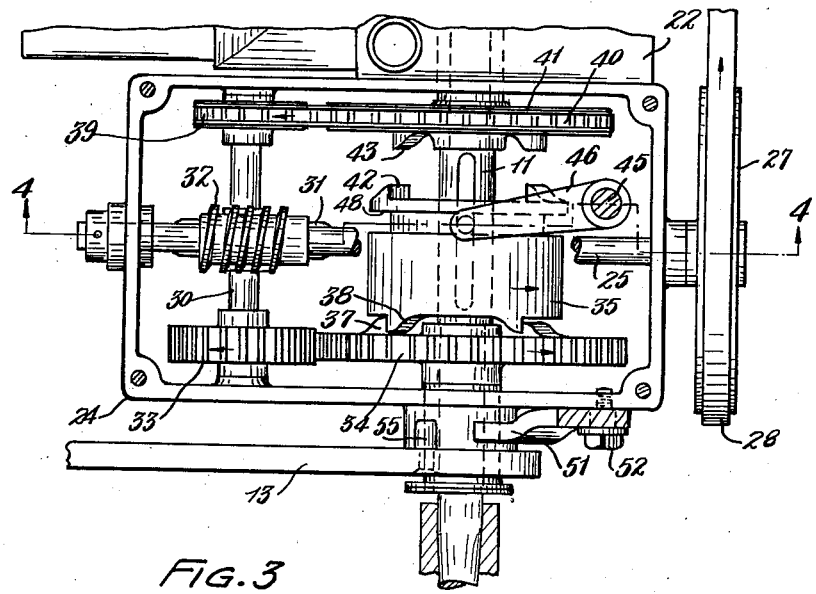
Figure 3 is a transverse sectional view taken on line 3—3 of Figure 2 and showing the transmission.

A transmission driven shaft 30 is disposed transversely within the housing 24 in parallelism with the axle 11 but disposed rearwardly therefrom, and has its opposite ends rotatably mounted in the adjacent side walls of the housing, as more clearly shown in Figure 3. The shaft 30 has an external gear 31 mounted thereon and keyed or otherwise secured for rotation therewith and disposed directly under the shaft 25. The shaft 25 has a worm 32 mounted on the shaft 25 and keyed thereto for positive rotation therewith, the worm being adapted for engagement with the gear 31 whereby, upon rotation of the shaft 25 in the direction indicated by the arrow, the worm will effect rotation of the gear 31 in the direction indicated by the arrow and a positive rotation of the shaft 30.

To impart rotation to the axle 11 an external gear 33 is rigidly mounted on the driven shaft 30 to one side of the gear 31 and meshes with an external gear 34 of larger diameter which is rotatably mounted on the axle 11 and normally independent of the rotation of the axle. To connect the gear 34 drivingly with the axle 11 a clutch 35 is slidably mounted on the axle 11 inwardly from the gear 34 and, while freely slidable along the axle within confined limits, is keyed at 36 so that the axle and slidable clutch always rotate in unison. The clutch 35 and the gear 34 have at their adjacent portions cooperating clutch teeth 37 and 38 which drivingly connect the gear 34 with the clutch 35 and through the keys 36 with the axle 11. Therefore, the rotation imparted to the driven shaft 30 is imparted to the gear 33 causing the latter to rotate in the direction indicated by the arrow which in turn imparts rotation to the external gear 34 in a reverse direction as indicated by the arrow and through the cooperating teeth and clutch to the axle 11 which is rotated in the direction indicated by the arrow, thus propelling the tractor in a forward direction as indicated by the arrow in Figure 2.

In order to reverse the direction of movement of the tractor and, therefore, the direction of rotation of the axle 11, the transmission driven shaft 30 has a sprocket wheel 39 mounted thereon for positive rotation therewith and disposed upon the opposite side of the gear 31. A sprocket wheel 40 of larger diameter is loosely mounted upon the axle 11 and both of the sprockets are connected by a chain 41 for imparting rotation from one to the other but in a direction opposite to that which is imparted from the external gear 33 to the external gear 34. The clutch 35 and the adjacent face of the sprocket wheel 40 likewise have cooperating clutch teeth 42 and 43, and when the clutch is moved along the axle 11, the engagement of the clutch teeth results in imparting rotation to the clutch in the direction in which the sprocket wheel is rotating, this of course, being in a reverse direction to that imparted to the clutch through its engagement with the external wheel 34. Sufficient space is provided between the clutch teeth 37 and the clutch teeth 43 so as to offer no interference with the engaging positions of the clutch.

Any suitable means may be employed for shifting the clutch from one position to the other but it has been found quite desirable to employ the handle 12, this being due to the fact that the handle 12 is pivoted for movement about the axle 11. This movement of the handle from one position to the other is very effective for shifting the clutch from engagement with the gear 34 to engagement with the sprocket wheel 40 and vice versa. A shifter fork 44 is disposed within the transmission housing 24 and includes a vertically disposed rod 45 having its opposite ends rotatably mounted in the bottom and top walls of the housing. A pair of laterally extending arms 46 project inwardly on opposite sides of the clutch 35 and the free ends have inwardly projecting lugs 47 which are disposed within a circumferential groove 48 to permit free relative rotation but cooperating for effecting movement of the clutch along the axle in either direction.

The upper end of the rod 45 projects vertically beyond the cover and one end of an arm 49 is securely connected thereto for effecting movement of the rod 45 about its axis. The arm 49 is laterally disposed and its free end projects beyond the outer side of the housing, as more clearly shown in Figure 1. A bell crank 51 is disposed upon the side wall of the housing and pivotally connected thereto at 52. The upper end 53 of the bell crank engages the free end of the arm 49 while the lower end 54 is positioned so as to be engaged by a pin 55 on the adjacent arm 13 for swinging the bell crank 51 about its pivotal axis as the handle 12 is moved from one end of the tractor to the other and back again.

It will be noted that the swinging of the handle 12 from one position to the other effects a reversal of the direction of travel of the tractor and that movement of the tractor in either direction may be interrupted or started by raising or lowering the handle 12 a sufficient distance so as to disengage or engage the clutch teeth and the cooperating gear or sprocket.

To prevent the engine and transmission housings from rotating about the axis of the axle, any suitable means may be provided but in the drawings a roller arrangement is shown consisting of a strap iron 56 welded or otherwise secured to the under side of the engine housing about midway between the wheels 10. The strap iron has its opposite ends bent downwardly and outwardly to receive a pair of rollers 57 swively connected at 58 and positioned so as to normally engage the ground on opposite sides of the axle 11.

In the operation of the tractor with the engine started in the usual manner and the handle in a downward position as shown in Figure 1, the tractor will be propelled forwardly in the direction of the arrow shown in Figure 2, the tools 20 turning the soil in a manner desired. At the end of the run to reverse the direction of travel of the tractor, the handle 12 is swung around the axle 11 to the position shown in dotted lines in Figure 2. This shifts the clutch 35 from engagement with the gear 34 into engagement with the sprocket wheel 40 which effects a reverse drive of the axle 11 and, consequently, movement of the tractor in the opposite direction. The movement of the handle 12 into the position shown by dotted lines in Figure 2 also places the cultivating tools in a position for working the soil effecting a return of the tractor without having had to turn the tractor about a vertical axis which is characteristic of the types now available and of which this tractor is a decided improvement.

While I have described the preferred embodiment of the invention it is to be understood that I am not to be limited thereto inasmuch as changes and modifications may be resorted to without departing from the spirit of the invention as defined in the appended claims.

What is claimed is:

1. A power propelled cultivating tractor comprising a pair of ground engaging wheels, an axle connecting said wheels for unitary rotation, means for selectively imparting rotation to said axle in one direction or the other for effecting movement of the tractor in opposite directions, a steering handle having its inner end pivotally connected to said axle and swingable to be in a following position with respect to the direction of travel of said tractor, and a pair of cultivating tools movable with said handle and selectively engageable with the ground depending upon the direction of travel of said tractor.

2. A power propelled cultivating tractor comprising a pair of ground engaging wheels, an axle connecting said wheels for unitary rotation, means for selectively imparting rotation to said axle in one direction or the other for effecting movement of the tractor in opposite directions, a steering handle having its inner end pivotally connected to said axle and swingable to be in a following position with respect to the direction of travel of said tractor, a tool supporting frame connected to said handle for movement therewith, and cultivating tools mounted at diametrically opposite portions of said frame and selectively engageable with the ground depending upon the direction of travel of said tractor.

3. A power propelled cultivating tractor comprising a pair of ground engaging wheels, an axle connecting said wheels for unitary rotation, means for selectively imparting rotation to said axle in one direction or the other for effecting movement of the tractor in opposite directions, a steering handle having its inner end pivotally connected so said axle and swingable to be in a following position with respect to the direction of travel of said tractor, the direction of rotation of said axle being controlled by the swinging movement of said handle, and a pair of cultivating tools movable with said handle and selectively engageable with the ground depending upon the direction of travel of said tractor.

4. A power propelled cultivating tractor comprising a pair of ground engaging wheels, an axle connecting said wheels for unitary rotation, a transmission operatively connected to said axle for imparting rotation to the latter in one direction or the other thus effecting movement of the tractor in opposite directions including a clutch drivingly connected to said axle and selectively movable for effecting positive rotation of said axle, a steering handle having its inner end pivotally connected to said axle and swingable to be in a following position with respect to the direction of travel of said tractor, cooperating means between said handle and clutch for effecting movement of the latter whereby said axle is rotated in one direction or the other depending upon the relative position of said handle, and a pair of cultivating tools movable with said handle and selectively engageable with the ground depending upon the direction of travel of said tractor.

5. A power propelled cultivating tractor comprising a pair of ground engaging wheels, an axle connecting said wheels for unitary rotation, a transmission operatively connected to said axle for imparting rotation to the latter in one direction or the other thus effecting movement of the tractor in opposite directions including a clutch drivingly connected to said axle and selectively movable for effecting positive rotation of said axle, a steering handle having its inner end pivotally connected to said axle and swingable to be in a following position with respect to the direction of travel of said tractor, cooperating means between said handle and clutch for effecting movement of the latter whereby said axle is rotated in one direction or the other depending upon the relative position of said handle, a tool supporting frame connected to said handle for movement therewith, and cultivating tools mounted at diametrically opposite portions of said frame and selectively engageable with the ground depending upon the direction of travel of said tractor.

6. A power propelled cultivating tractor comprising a pair of ground engaging wheels, an axle connecting said wheels for unitary rotation, an engine supported on said axle and disposed between said wheels, a transmission supported on said axle and disposed between said wheels, said engine and transmission being drivingly connected, said transmission being operatively connected to said axle for imparting rotation to the latter in one direction or the other thus effecting movement of the tractor in opposite directions including a clutch drivingly connected to said axle and selectively movable for effecting positive rotation of said axle, a steering handle having its inner end pivotally connected to said axle and swingable to be in a following position with respect to the direction of travel of said tractor, cooperating means between said handle and clutch for effecting movement of the latter whereby said axle is rotated in one direction or the other depending upon the relative position of said handle, and a pair of cultivating tools movable with said handle and selectively engageable with the ground depending upon the direction of travel of said tractor.

PERRY B. DREISBAUGH.